US008868977B2

(12) United States Patent
Birnbaum et al.

(10) Patent No.: US 8,868,977 B2
(45) Date of Patent: Oct. 21, 2014

(54) UTILIZING AUXILIARY VARIABLES IN MODELING TEST SPACE FOR SYSTEM BEHAVIOR

(75) Inventors: Ariel Birnbaum, Kiryat Motzkin (IL); Rachel Tzoref-Brill, Haifa (IL); Steven Mittermaier, New York, NY (US); Itai Erwin Segall, Tel-Aviv (IL); Avi Ziv, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 13/163,702

(22) Filed: Jun. 19, 2011

(65) Prior Publication Data
US 2012/0324286 A1 Dec. 20, 2012

(51) Int. Cl.
G06F 11/00 (2006.01)
G06F 11/36 (2006.01)

(52) U.S. Cl.
CPC .................................. G06F 11/3608 (2013.01)
USPC ................. 714/32; 714/43; 714/48; 714/25; 714/704; 714/733; 714/13; 714/36; 703/21

(58) Field of Classification Search
USPC ............. 714/43, 48, 25, 704, 733, 13, 32, 36; 703/21
See application file for complete search history.

(56) References Cited

U.S. PATENT DOCUMENTS

| 6,393,594 | B1* | 5/2002 | Anderson et al. | 714/738 |
|---|---|---|---|---|
| 2002/0002698 | A1* | 1/2002 | Hekmatpour | 716/4 |
| 2003/0110474 | A1 | 6/2003 | Ur et al. | |
| 2010/0042385 | A1* | 2/2010 | Fournier et al. | 703/6 |
| 2010/0274520 | A1* | 10/2010 | Ur et al. | 702/123 |
| 2012/0324414 | A1* | 12/2012 | Tzoref-Brill et al. | 716/136 |

OTHER PUBLICATIONS

Grindal, M., Offutt, J., Andler, S.F., "Combination testing strategies: a survey". Softw. Test, Verif. Reliab 15(3), 167-199 (2005).
S. G. Govindaraju, D. L. Dill, J. P. Bergmann, "Improved Approximate Reachability using Auxiliary State Variables", Proceedings of the 36th annual ACM/IEEE Design Automation Conference (DAC '99).
T. Kleymann. "Hoare logic and auxiliary variables". Formal Aspects of Computing, 11(5):541-566, (1999).
U. Bubeck, H. Kleine Büning. "The Power of Auxiliary Variables for Propositional and Quantified Boolean Formulas". In Studies in Logic, vol. 3, No. 3, pp. 1-23,. 2010.
Gil Ratzaby et al., "Coverability Analysis Using Symbolic Model Checking", Proceeding CHARME '01 Proceedings of the 11th IFIP WG 10.5 Advanced Research Working Conference on Correct Hardware Design and Verification Methods, 2001.

* cited by examiner

*Primary Examiner* — Joshua P Lottich
*Assistant Examiner* — Jeison C Arcos

(57) ABSTRACT

Systems and methods for modeling test space for verifying system behavior, using one or more auxiliary variables, are provided. The method comprises implementing a functional coverage model including: one or more attributes, wherein respective values for the attributes are assigned according to a test plan, and one or more constraints defining restrictions on value combinations assigned to the attributes, wherein the restrictions are Boolean expressions defining whether said value combinations are valid; determining a set of valid value combinations for the attributes that satisfy the restrictions to define the test space for verifying the system behavior; and determining relevant auxiliary variables and a corresponding function for said auxiliary variables to reduce the complexity associated with modeling the test space.

20 Claims, 4 Drawing Sheets

UTILIZING AUXILIARY VARIABLES IN MODELING TEST SPACE FOR SYSTEM BEHAVIOR

COPYRIGHT & TRADEMARK NOTICES

A portion of the disclosure of this patent document may contain material subject to copyright protection. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to modeling test space for system behavior and, more particularly, to a system and method for using auxiliary variables to reduce complexity of such modeling.

BACKGROUND

Simulation-based techniques are one of the instruments for testing a computing system. The system under test, usually in the form of software or program code, is executed on simulated environments to verify whether the system generates the expected results. Verification is typically done by analyzing the test results generated in simulated environments.

A main concern inherent to verification by simulation is proper test coverage (i.e., whether all or at least the most important aspects of the system are covered by the test model). Test planning techniques are used to try to focus on target coverage areas by preventing omissions in testing, before the tests are implemented and executed. One technique involves narrowing down a large test space.

To minimize the risk of narrowing down the test space too much (i.e., to a point that certain bugs in the software may escape the test scope), test planning techniques may be used that require modeling of the test space as a functional coverage model. Functional coverage focuses on the functionality of the system under test, and is used to check that every aspect of the system's functionality is tested.

Functional coverage may be used to measure the extent to which testing covers program capabilities and is implementation specific. As a result, a functional coverage model is generally difficult to design, due to the variety of factors (e.g., inputs, scenarios, configurations, the application's internal state, etc.) that may have to be taken into consideration.

Traditionally, a functional coverage model includes a set of variables (i.e., attributes), the respective values of the variables, and restrictions on their value combinations. The restrictions are Boolean expressions defining when value combinations are valid or invalid. The set of valid value combinations (i.e. all combinations from the product of the values that pass the restrictions) defines the space to be tested. Such combinatorial modeling of the test space usually requires manual effort.

In a combinatorial test design, a subset of the test space is selected so that it covers all possible combinations of n number of variables. The required coverage of the selected subset is referred to as interaction level (i.e., interaction level 2 means that for every two variables, all valid value combinations must appear in the selected subset of the test space)—the motivation for this approach is that statistics show that most bugs depend on the interaction between a small number of variables.

One of the problems encountered by modeling tools is the scalability issue. The size of the model is the product of the number of values for each attribute, and grows exponentially with the number of attributes. The number of restrictions also tends to grow rapidly when one needs to express complex relations between attributes. The required amount of manual effort, computation time, as well as the size of the inner representation of the model, may grow as the number of restrictions grows. Thus, for some models, it is practically impossible to express even relatively simple relations between attributes.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for modeling test space for verifying system behavior, using one or more auxiliary variables comprises implementing a functional coverage model including: one or more attributes, wherein respective values for the attributes are assigned according to a test plan, and one or more constraints defining restrictions on value combinations assigned to the attributes, wherein the restrictions are Boolean expressions defining whether said value combinations are valid; determining a set of valid value combinations for the attributes that satisfy the restrictions to define the test space for verifying the system behavior; and determining relevant auxiliary variables and a corresponding function for said auxiliary variables to reduce the complexity associated with modeling the test space.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one or more embodiments, a functional coverage model is implemented to test a target system. The model comprises attributes, values for the attributes, and restrictions defining when value combinations are valid or invalid. The set of valid value combinations defines the test scope. Thus, the size of the test scope may be defined by the product (e.g., the Cartesian product) of attribute values, taking into account the dictated restrictions. That is, the verification space for the model may be defined by the product of the number of values for each attributes.

Depending on implementation, the complexity of the verification space may be reduced by, for example, narrowing down the test space or defining test coverage requirements. In one embodiment, determining relevant auxiliary variables and a corresponding function for said auxiliary variables may help reduce the complexity of the verification for the model under test. Auxiliary variables may be defined as a function of other attributes and auxiliary variables in the model, wherein desirably the introduction of the auxiliary variables does not increase the size of the model, but helps refine the model under test.

In other words, unlike other variables in the model, explicit values are not assigned to the auxiliary variables, so as not to include them in the Cartesian product that defines the scope of the test. Instead, a function for each auxiliary variable is used, where the input to the function is the assignment of values to the system attributes or auxiliary variables, and the output is a value for the auxiliary variable. Thus, given the function and the values of the target attributes, unique values for the auxiliary variables may be determined.

In one embodiment, restrictions defined using the auxiliary variables are easily (e.g., automatically) translated into restrictions that apply to the attributes. Since auxiliary variables do not participate in the Cartesian product, nor in the restrictions after the automatic substitution, the computational overhead in introducing them is minor. Accordingly, instead of testing a model for all possible values that can be assigned to the set of attributes in the model, auxiliary variables are used to indirectly define restrictions on the values of the attributes, so that the test space is narrowed to scenarios that are of interest.

Figure 1:
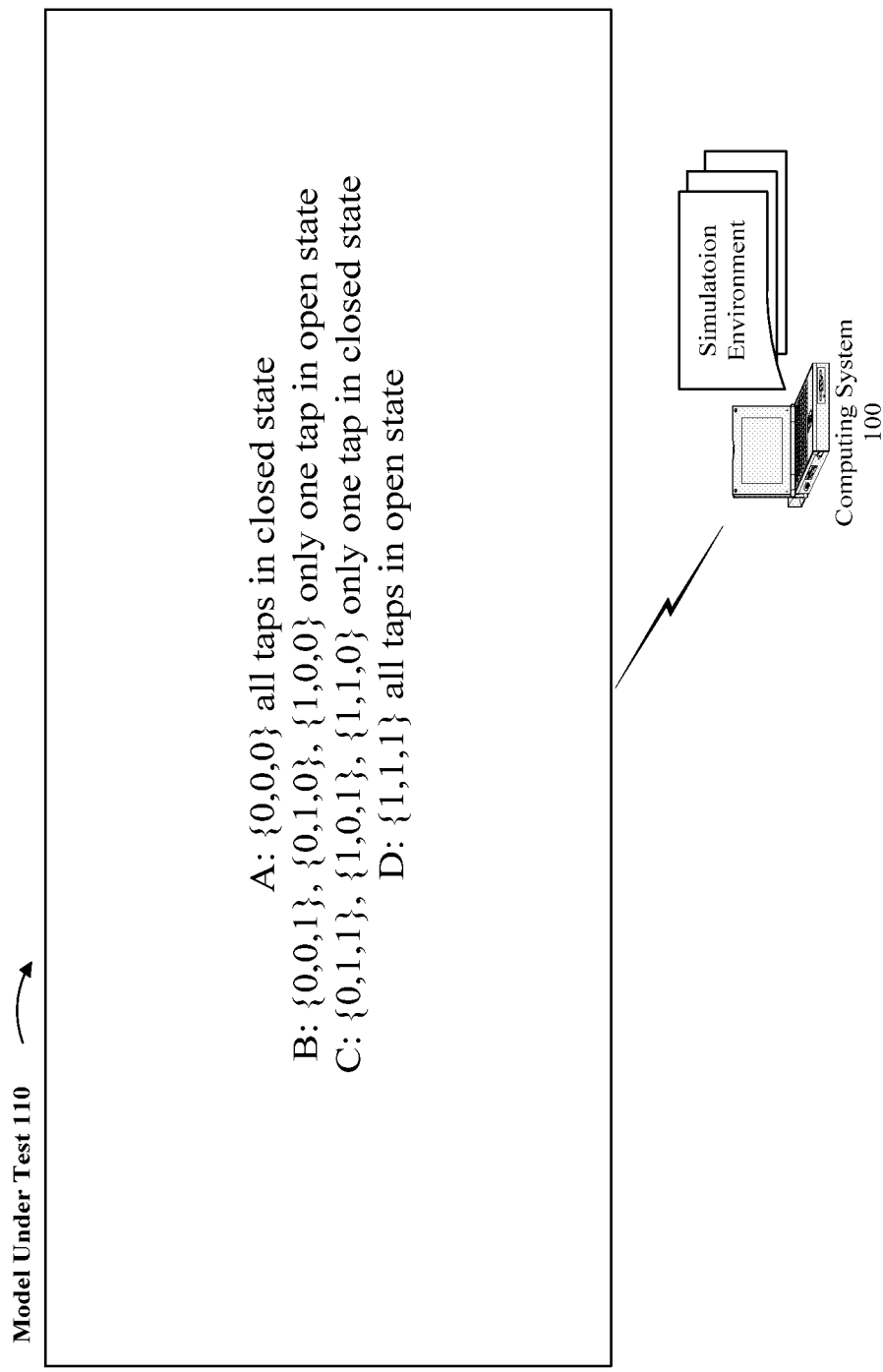
FIG. 1 illustrates an exemplary computing environment in accordance with one or more embodiments, wherein a test model is implemented for verifying a computing system.

Referring to FIG. 1, for example, a model under test 110 may be provided in a simulation (or non-simulation based) environment constructed over computing system 110 to test the functionality of N water taps, where for example a value of 0 represents a tap in a closed state, and a value of 1 represent a tap in the open state. N+1 sets may be defined where each member of the set represents a test. In an example scenario involving 3 water taps, the following presentation of possible states may be provided according to sets A, B, C and D:

A: {0,0,0} all taps in closed state
B: {0,0,1}, {0,1,0}, {1,0,0} only one tap in open state
C: {0,1,1}, {1,0,1}, {1,1,0} only one tap in closed state
D: {1,1,1} all taps in open state An auxiliary function for the above model may be defined as $f(T1, T2, T3)$ in which T1, T2, T3 define the tap variables (i.e., test attributes) such that in each set, only x taps are open (i.e., the function defines the volume of water collectively gathered from all open taps). Thus, x may be defined as $f(T1, T2, T3)$ where the value of x is determined by evaluating a given (e.g., user-supplied) function on the values of T1, T2, T3. In this example, the function is defined as the sum of certain attributes (e.g., $x=T1+T2+T3$), where T1, T2, T3 are Bollean values 0 or 1—depending on implementation, 0 indicates a closed state, and 1 indicates an open state, for example.

Based on the above, if a restriction is defined as $x<2$, then the model under test is reduced to 4 test scenarios with values for the corresponding variables for each test scenario being defined by elements in sets A and B. On the other hand, if user defines $x=2$, then the model is reduced to 3 test scenarios with values for the corresponding variable defined by the elements in set C. Accordingly, in the simple example above, using the auxiliary variable x and the respective function $f(T1, T2, T3)$, one may define the test scenarios of interest without directly assigning values to are the attributes (i.e., T1, T2, T3) in the model and testing every probable scenario.

The model illustrated in FIG. 1 and discussed above represents a simplified example in which auxiliary attributes and functions may be utilized to derive the values for the attributes under test and the respective restrictions, in contrast to having to manually determine all the possible scenarios and try to narrow down a test model by setting values and restrictions for various attributes in the model. As noted earlier, the auxiliary variables are introduced into the functional model such that the values of the auxiliary variables are uniquely determined by the values given to the other attributes based on one or more auxiliary functions.

To illustrated, the utility and usefulness of auxiliary variables further, as another example, assume a model has 10 Boolean attributes, and the user wishes to add a numeric attribute that counts how many of these are true. Using existing functional modeling techniques, the user would have to add a numeric attribute with values 0-11, and write complex restrictions that relate the value of this attribute to the values of the other 10. The user can thus write $2^{10}=1024$ restrictions, one for each combination of values to the Boolean attributes, where each one restricts the value of the counting attribute to the required value.

The above practice sums up to a very large amount of manual effort, in addition to the need for a relatively substantial computation power and other computing resources. Note that when the new attribute with 11 values is introduced, the possible test space was immediately multiplied by 11, and the functional modeling tool also has 1024 more restrictions to process, which are relatively complex, considering 11 attributes each.

As provided below, using auxiliary variables that do not participate directly in the model, the manual efforts expended by the user for defining the values of auxiliary variables in the above example may be minimized. Accordingly, let's assume that O1 represents the set of tests in which tap 1 is open and C1 as the set of all tests in which tap 1 is closed. Similarly O2, C2, O3 and C3 may be used to represent open and closed states for taps 2 and 3.

Set A (in which all taps are closed) is exactly the intersection of C1, C2, C3 (i.e., the set of tests in which tap 1 is closed and tap 2 is closed and tap 3 is closed). Set B is the union of three sets (i.e., the intersection of C1, C2, O3; the intersection of C1, O2, C3; and the intersection of O1, C2, C3; and so on). A restriction $x<2$ will be translated into the intersection of A and B. Note that the sets to intersect and unite may be easily derived from an auxiliary function.

Also note that set operations such as intersection, unification, etc. may be computed efficiently if the appropriate data structures are used. And also that there may be more variables in the model that are not counted by x. They will affect the sizes of the sets above (i.e., the number of tests that each set represents), but not the computation time for the computations above, assuming that efficient data structures are used.

For example, the set of tests conforming to auxiliary function defined by $x<2$ may be more than 4 tests, as there may be other variables not counted by x. In an extended example, there may be another variable L introduced as a means to indicate whether a light is on or not at the same time that the taps are running. In this example, $x<2$ stands for 8 tests (i.e., the 4 relevant combinations of the taps times the two possible values for L).

Figure 2:
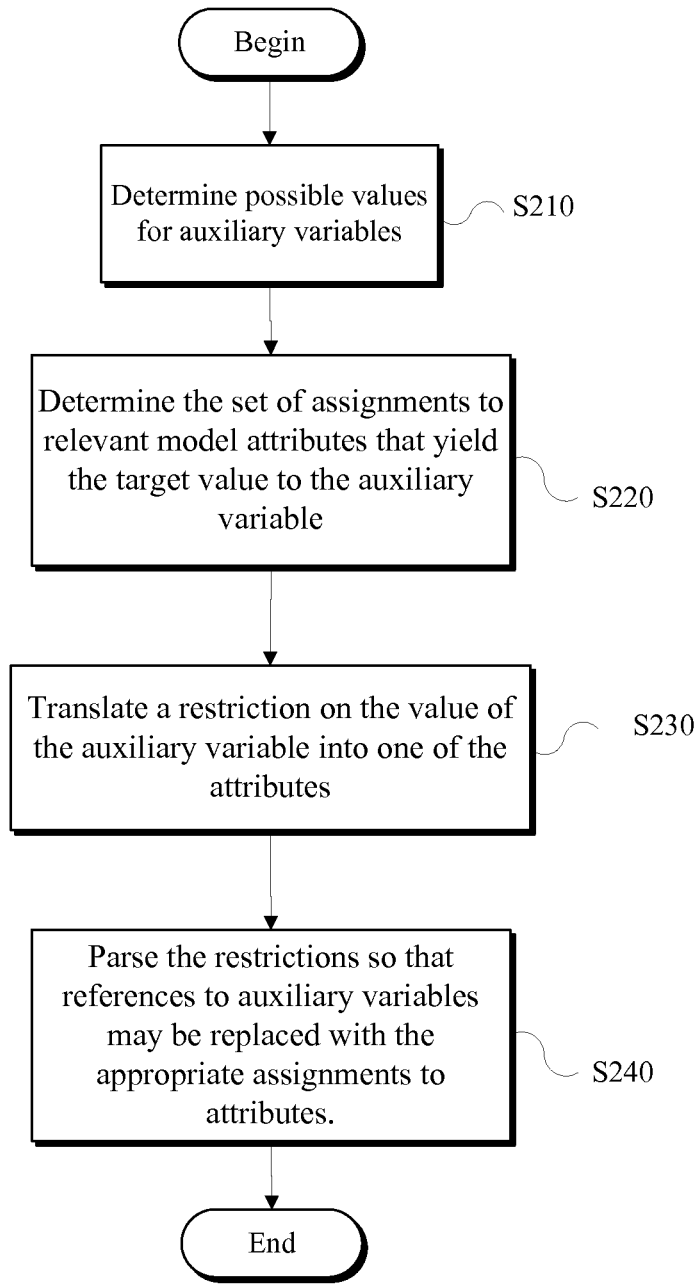
FIG. 2 is a flow diagram of an exemplary method for modeling a test space for system behavior, using auxiliary variables, in accordance with one embodiment.

Referring to FIG. 2, depending on implementation, a possible method or system for translating restrictions on auxiliary variables into restrictions on attributes may involved the following:

For each auxiliary variable, determine the possible values that may be assigned to an auxiliary variable (S210).

For each auxiliary variable, determine the set of assignments to relevant model attributes that yield the target value to the auxiliary variable. For example, in the example above, where the 10 Boolean attributes are present, a variable may be used to count how many of the Boolean attributes are set to 1 (i.e., true). Eleven sets of assignment, one for each value 0-10 may be constructed, such that for auxiliary variable i, the set comprises assignments to the 10 Boolean attributes in which exactly i are true.

Translate a restriction on the value of the auxiliary variable into one of the attributes. For example, if the auxiliary variable x above is restricted to be between 2 and 4, this can be translated into the intersection of the sets for values 2, 3 and 4. This computation may be also carried out symbolically when the sets are kept symbolically.

Parse the restrictions so that references to auxiliary variables may be replaced with the appropriate assignments to attributes. Restrictions may refer to both auxiliary variables and normal attributes.

Referring to the example with the L variable above, a restriction may be introduced that when $L=0$ then $x<2$. Based on the restricted value of L, a restriction is placed on the actual test variables (T1, T2, T3, L). As indicated, the above may also be computed using set operations.

Other non-limiting example usages of auxiliary variables may include an auxiliary variable that is a mathematical function on several numeric attributes (e.g., sum, minimum, etc.). In the example of FIG. 1, assume that the taps be assigned values 0, 1, 2, respectively representing states associated with fully closed, halfway open, and fully open. In this scenario, an auxiliary variable y may be defined by a first auxiliary function to represent the maximum of T1, T2, T3, standing for the amount of flow from the tap that is open the most. To restrict the test scope to scenarios in which no tap is open completely the value of y may be defined as $y<2$.

In some embodiments, auxiliary variables may be used to define an order on several values, and the value of the auxiliary variable may be set equal to the first value appearing in the assignment, according to this order. For example, again referring to the scenario in FIG. 1, value Z may be used to define the left-most tap that is open, where the taps are ordered T1-T2-T3, and Z is the index of the first of them that is 1.

In one embodiment, an auxiliary variable may be set equal to the value that appears the most in an assignment to a given set of attributes. In the example of FIG. 1, a variable may be designated that checks whether most taps are open, or most taps are closed (i.e., by determining whether there are more ones or more zeros in T1, T2, T3).

In another embodiment, an auxiliary variable may be set to count the number of appearances of given values in given attributes. In the example of FIG. 1, assume that the taps are assigned values 0, 1, 2, respectively representing states associated with fully closed, halfway open, and fully open. In this scenario, an auxiliary variable may be defined as the number of appearances of the values 1 or 2 in variables T1, T2, T3, standing for the number of taps that are open.

It is noteworthy that the above disclosed scenarios and embodiments are provided by way of example and that, depending on implementation, other types of auxiliary variables and functions may be utilized to address alternative objectives in configuring a test space. As such, the above examples should not be construed as limiting the scope of the claimed subject matter to the disclosed example scenarios or details.

Further, in the above disclosure a method for translating restrictions on auxiliary variables into restrictions on attributes was discussed with the assumption that the auxiliary function is reversible (i.e., that for every possible value of the auxiliary variable, one can easily compute the assignments to the relevant attributes that result in the target value for this auxiliary variable).

In other embodiments, for example, when the auxiliary function is not reversible, depending on implementation, other possible methods for translating restrictions on auxiliary variables into restrictions on attributes may be utilized, as provided below:

If the set of attribute domains relevant to the auxiliary variable is small, iterate over all possible assignments to these attributes, and for each assignment compute the value of the auxiliary variable. Then, continue as provide above, i.e., translate each restriction on the value of the auxiliary variable into one on the attributes.

Otherwise, substitute appearances of the auxiliary variable with the expression that evaluates it. For example, if an auxiliary variable V is defined as the sum of A1, A2 and A3, replace appearance of V with A1+A2+A3. This reduces the problem into the domain of Cartesian-product-based functional models without auxiliary variables.

For the purpose of providing a full disclosure, a complete example applying the methods discussed above is provided below. It is noteworthy, however, that the provided example below is based on one of many possible implementations and embodiments. And that the details disclosed in this example are not to be used to construe the scope of the claimed subject matter narrowly as limited to said details or features thereof.

Referring back to FIG. 1, consider a system that controls 10 water taps, where each tap may be open or closed. The amount of water flowing is a function of the number of open taps. A reasonable test plan for such a system would require that every tap is tested at least once in an open and in a closed state. However, for the interaction of the water flow with other components (e.g., the drainage component), determining the total amount of water flowing suffices.

Accordingly, a model may be constructed in which 10 Boolean attributes represent the states of the taps, and another attribute correctly captures the number of open taps. In existing functional modeling tools, in order to build such a model, one will have to go through the following steps:

Define 10 Boolean attributes representing the states of the 10 water taps.

Define an attribute (e.g., WaterFlowAmount), with 11 values, 0-11.

Write restrictions that restrict the resulting Cartesian product to only assignments where the WaterFlowAmount is equal to the number of open taps. (Note that this would involve a very tiresome and error-prone manual process.)

Parse said restrictions, which are relatively complex ones (i.e., each restriction may have as many as 11 attributes), and conclude how the target state space may be derived from the much larger entire state space. (Note that this step may be a very expensive, computation-wise and memory-wise.)

Now considering an embodiment in which use of auxiliary variables is supported, the above process becomes much simpler, both in manual labor and in processing resources, as the steps are simplified to the following:

Define 10 Boolean attributes representing the states of the 10 water taps.

Define an auxiliary variable (e.g., WaterFlowAmount) of type Counter, for example, where the auxiliary variable counts the number of True values (e.g., 1) in the 10 tap attributes. Note that in this implementation, the size of the state space is not affected by the introduction of the auxiliary variable, since it does not participate in the Cartesian product that defines the test space.

Partition the state space of the 10 water taps into 11 sets, where in the i'th set, exactly i taps are open.

If there is a user-defined restriction that refers to the WaterFlowAmount variable, substitute the restriction with the corresponding set.

Further consider a scenario where the water taps are integer attributes that can be assigned integer values. In existing functional modeling tools, building an attribute that represents the total water flow becomes even more cumbersome, error prone, and computationally hard. With auxiliary variables, this may be performed in a manner similar to the one disclosed above, with an auxiliary variable that sums the values of the 10 attributes as provided earlier.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 3A:
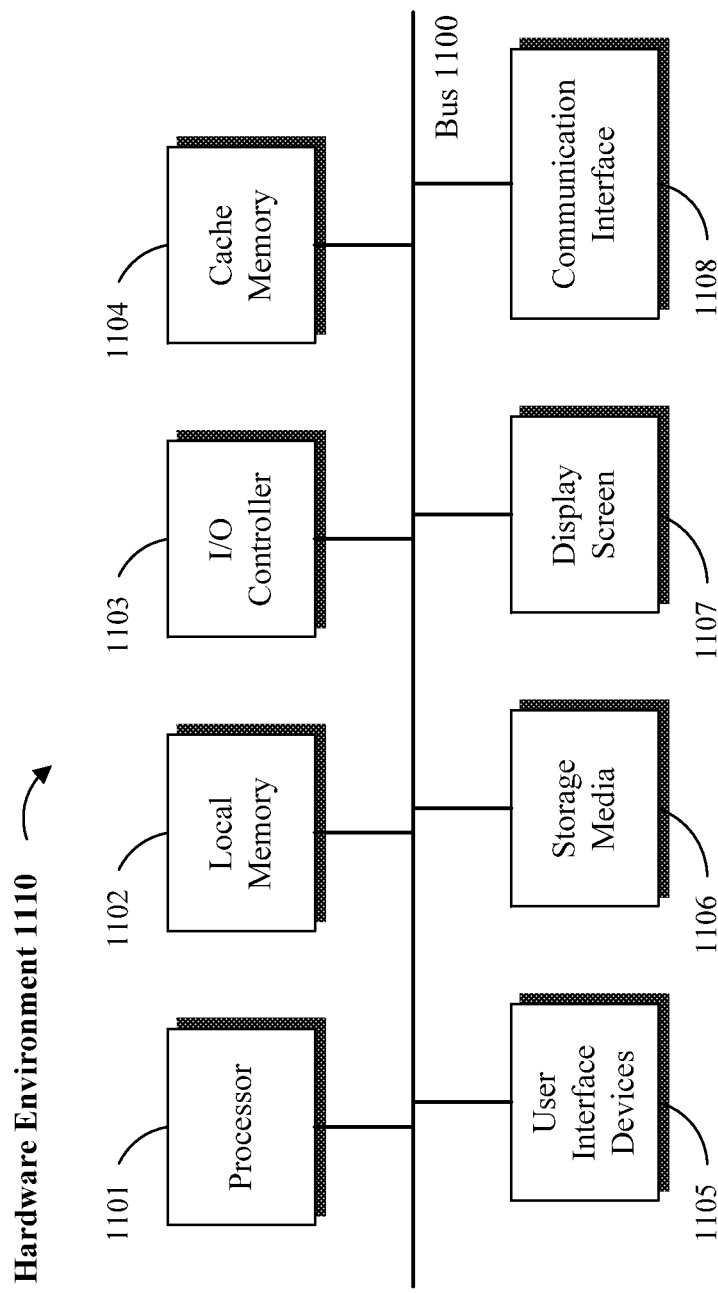
FIGS. 3A and 3B are block diagrams of hardware and software environments in which the disclosed systems and methods may operate, in accordance with one or more embodiments.
Figure 3B:
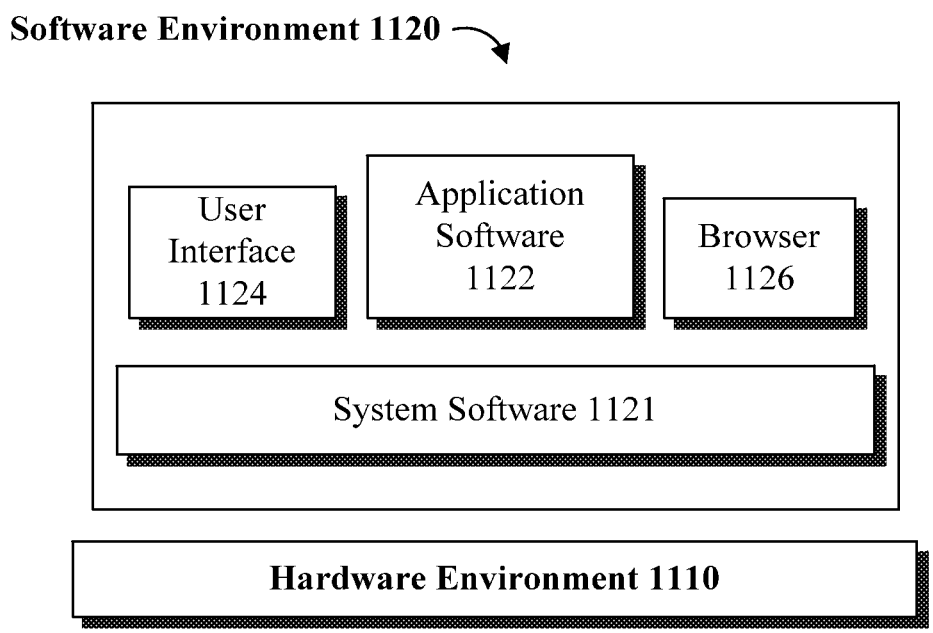

Referring to FIGS. 3A and 3B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 3A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 3B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for modeling test space for verifying system behavior, using one or more auxiliary variables, the method comprising:
    implementing a functional coverage model including:
        one or more attributes, wherein respective values for the attributes are assigned according to a test plan, and
        one or more constraints defining restrictions on value combinations assigned to the attributes, wherein the restrictions are Boolean expressions defining whether said value combinations are valid;
    determining a set of valid value combinations for the attributes that satisfy the restrictions to define the test space for verifying the system behavior; and
    determining relevant auxiliary variables and a corresponding function for said auxiliary variables to reduce the complexity associated with modeling the test space,
    wherein one or more of the above steps is performed via a processor.

2. The method of claim 1, wherein the auxiliary variables are defined as a function of the attributes and other auxiliary variables in the coverage model.

3. The method of claim 2, wherein introduction of the auxiliary variables in the coverage model does not increase size of the coverage model.

4. The method of claim 2, wherein introduction of the auxiliary variables in the coverage model helps define restriction boundaries for the coverage model.

5. The method of claim 2 further comprising determine set of assignments to relevant model attributes that yield a target value to the auxiliary variables.

6. The method of claim 5 further comprising translating at least one of the restrictions on the value of the auxiliary variables into one or more attributes.

7. The method of claim 6 further comprising parsing the restrictions so that references to auxiliary variables may be replaced with value of assignments to attributes.

8. The method of claim 5, wherein if a set of attribute domains relevant to the auxiliary variables is smaller than a threshold,
    iterating over possible assignments to the attributes, and
        for each assignment computing value of the auxiliary variable; and
    translating at least one of the restrictions on the value of the auxiliary variables into one or more attributes.

9. The method of claim 8, wherein if a set of attribute domains relevant to the auxiliary variables is not smaller than a threshold,
    substituting appearances of an auxiliary variable with an expression that evaluates the auxiliary variable.

10. The method of claim 1, wherein value combinations derived from product of values assigned to the attributes that pass the restrictions define the test space.

11. A system for modeling test space using one or more auxiliary variables, the system comprising:
    one or more processors;
    a logic unit for implementing a functional coverage model including:
        one or more attributes, wherein respective values for the attributes are assigned according to a test plan, and
        one or more constraints defining restrictions on value combinations assigned to the attributes, wherein the restrictions are Boolean expressions defining whether said value combinations are valid;
    a logic unit for determining a set of valid value combinations for the attributes that satisfy the restrictions to define the test space for verifying behavior of a computing environment under test; and
    a logic unit for determining relevant auxiliary variables and a corresponding function for said auxiliary variables to reduce the complexity associated with modeling the test space.

12. The system of claim 11, wherein the auxiliary variables are defined as a function of the attributes and other auxiliary variables in the coverage model.

13. The system of claim 12, wherein introduction of the auxiliary variables in the coverage model does not increase size of the coverage model.

14. The system of claim 12, wherein introduction of the auxiliary variables in the coverage model helps define restriction boundaries for the coverage model.

15. The system of claim 12 further comprising determine set of assignments to relevant model attributes that yield a target value to the auxiliary variables.

16. The method of system 11, wherein value combinations derived from product of values assigned to the attributes that pass the restrictions define the test space.

17. A computer program product comprising a non-transitory machine-readable storage medium having a computer readable program, wherein the computer readable program when executed on a computer causes the computer to:
    implement a functional coverage model including:
        one or more attributes, wherein respective values for the attributes are assigned according to a test plan, and
        one or more constraints defining restrictions on value combinations assigned to the attributes, wherein the restrictions are Boolean expressions defining whether said value combinations are valid;
    determine a set of valid value combinations for the attributes that satisfy the restrictions to define the test space for verifying behavior of a system under test; and
    determine relevant auxiliary variables and a corresponding function for said auxiliary variables to reduce the complexity associated with modeling the test space.

18. The computer program product of claim 17, wherein the auxiliary variables are defined as a function of the attributes and other auxiliary variables in the coverage model.

19. The computer program product of claim 18, wherein introduction of the auxiliary variables in the coverage model does not increase size of the coverage model.

20. The computer program product of claim 18, wherein introduction of the auxiliary variables in the coverage model helps define restriction boundaries for the coverage model.

\* \* \* \* \*